United States Patent [19]

Komurasaki

[11] Patent Number: 4,606,316
[45] Date of Patent: Aug. 19, 1986

[54] IGNITION TIMING CONTROL SYSTEM FOR INTERNAL COMBUSTION ENGINE

[75] Inventor: Satoshi Komurasaki, Hyogo, Japan

[73] Assignee: Mitsubishi Denki Kabushiki Kaisha, Tokyo, Japan

[21] Appl. No.: 705,399

[22] Filed: Feb. 25, 1985

Related U.S. Application Data

[63] Continuation of Ser. No. 381,661, May 24, 1982, abandoned.

[51] Int. Cl.$^4$ .............................................. F02P 5/14
[52] U.S. Cl. .................................................. 123/425
[58] Field of Search ................ 123/425, 435, 479; 73/35

[56] References Cited

U.S. PATENT DOCUMENTS

| | | | |
|---|---|---|---|
| 4,320,729 | 3/1982 | Sawada et al. | 123/425 |
| 4,357,919 | 11/1982 | Hattori et al. | 123/479 |
| 4,370,963 | 2/1983 | Iwata et al. | 123/425 |
| 4,377,999 | 3/1983 | Komurasaki et al. | 123/425 |
| 4,481,924 | 11/1984 | Kobayashi | 123/425 |
| 4,495,918 | 1/1985 | Sugiura | 123/425 |

FOREIGN PATENT DOCUMENTS 0176362  10/1982  Japan ................................. 123/425

*Primary Examiner*—Willis R. Wolfe
*Attorney, Agent, or Firm*—Sughrue, Mion, Zinn, Macpeak & Seas

[57] ABSTRACT

In an ignition timing control system which utilizes a knock sensor, a malfunction detecting circuit detects sensor malfunction in response to which the ignition timing is then controlled independently of the presence or absence of knock.

9 Claims, 27 Drawing Figures

TIME ⟶   TIME ⟶

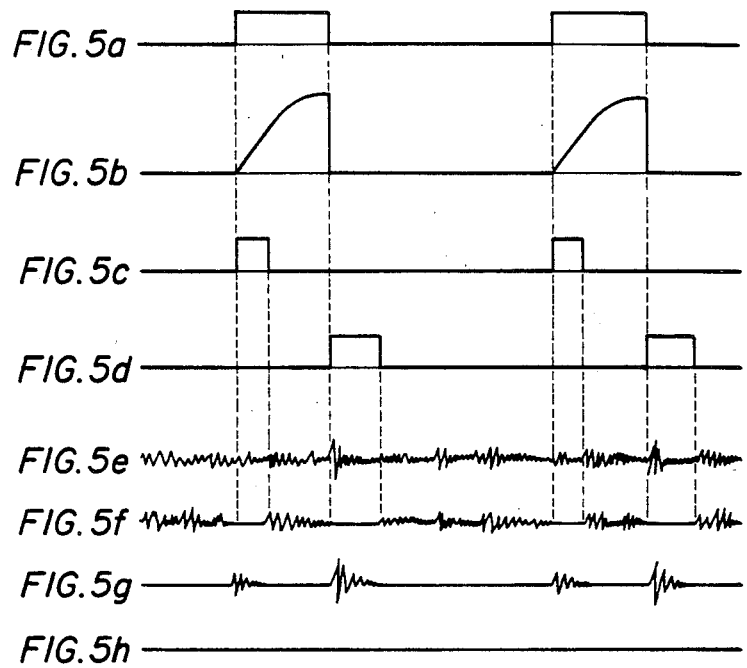
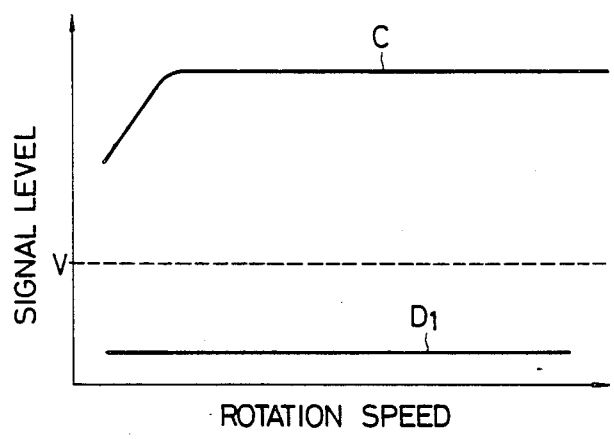

ial combustion engine, and more particularly to a system for detecting the malfunction of a vibratory acceleration sensor which is used to detect the knocking.

IGNITION TIMING CONTROL SYSTEM FOR INTERNAL COMBUSTION ENGINE

This is a continuation of application Ser. No. 381,661, filed May 24, 1982, now abandoned.

BACKGROUND OF THE INVENTION

The present invention relates to an ignition timing control system for restraining the knocking of an internal combustion engine, and more particularly to a system for detecting the malfunction of a vibratory acceleration sensor which is used to detect the knocking.

It is desired that the ignition timing of an internal combustion engine be set so as to be most efficient for the running mode of the engine. It is also generally desired that the ignition timing be so set as to fall within a range, in which the engine is free from any knocking, as close as possible to the "MBT" (i.e., Minimum advance for Best Torque). However, most of the ingition timing control systems according to the prior art are of such mechanical type that their ignition angle advancing characteristics are unstable due to variation in materials and due to aging. In order to prevent knocking, therefore, the actual ignition timing is set at a considerably retarded angle with respect to the aforementioned desirable ignition angle advancing characteristics.

At this retarded angle, the efficiency of the engine is degraded. Moreover, even if an ignition timing control system is used having neither significant materials variation nor aging problems, the knocking phenomena are influenced by the temperature and moisture of the intake air as well as the air-fuel ratio of the engine. As a result, even if the ignition timing is so set that no knocking takes place under a certain condition, there is a danger that knocking will nevertheless occur under different running conditions.

If, with this in mind, a control function is conducted to detect the knocking and retard the ignition timing if knocking occurs, the ignition timing can be so adjusted that little knocking takes place even if an error is caused in the ignition angle advancing characteristics due to the material characteristic variations inherent in the mechanical type or due to the difference in running conditions, as has been described hereinbefore.

Thus, the ignition timing control system of the above type is able to achieve the optimum ignition timing by setting in advance the reference ignition angle advancing characteristics at a more advanced angle so as to come closer to the MBT and by effecting an angle retarding control at a proper time in response to the occurrence of knocking.

In case, however, the knocking detecting system malfunctions, there arises a problem. Specifically, if the knocking detecting system malfunctions, no knocking information is obtained so that the proper angle retarding control cannot be accomplished. This results in a serious problem that the engine is so highly vibrated by the knocking that it may possibly be damaged.

In order to cope with this problem, it is desired to control the ignition timing such that no knocking takes place, or to generate a warning signal.

SUMMARY OF THE INVENTION

In view of the background thus far described, it is an object of the present invention to provide an ignition timing control system for preventing knocking and for detecting the malfunction of a vibratory acceleration type knocking detection system, said ignition timing control system being able to detect the malfunction in the output signal line of the vibratory acceleration sensor or the acceleration sensor of the engine and to detect that malfunction without any difficulty even in case the vibratory acceleration sensor is either a magnetic strain sensor or a piezoelectric ceramic sensor.

BRIEF DESCRIPTION OF THE DRAWINGS

In the drawings:

FIG. 6 is a graph illustrating the characteristics for explaining the operations of FIG. 1.

DETAILED DESCRIPTION OF THE INVENTION

Figure 1:
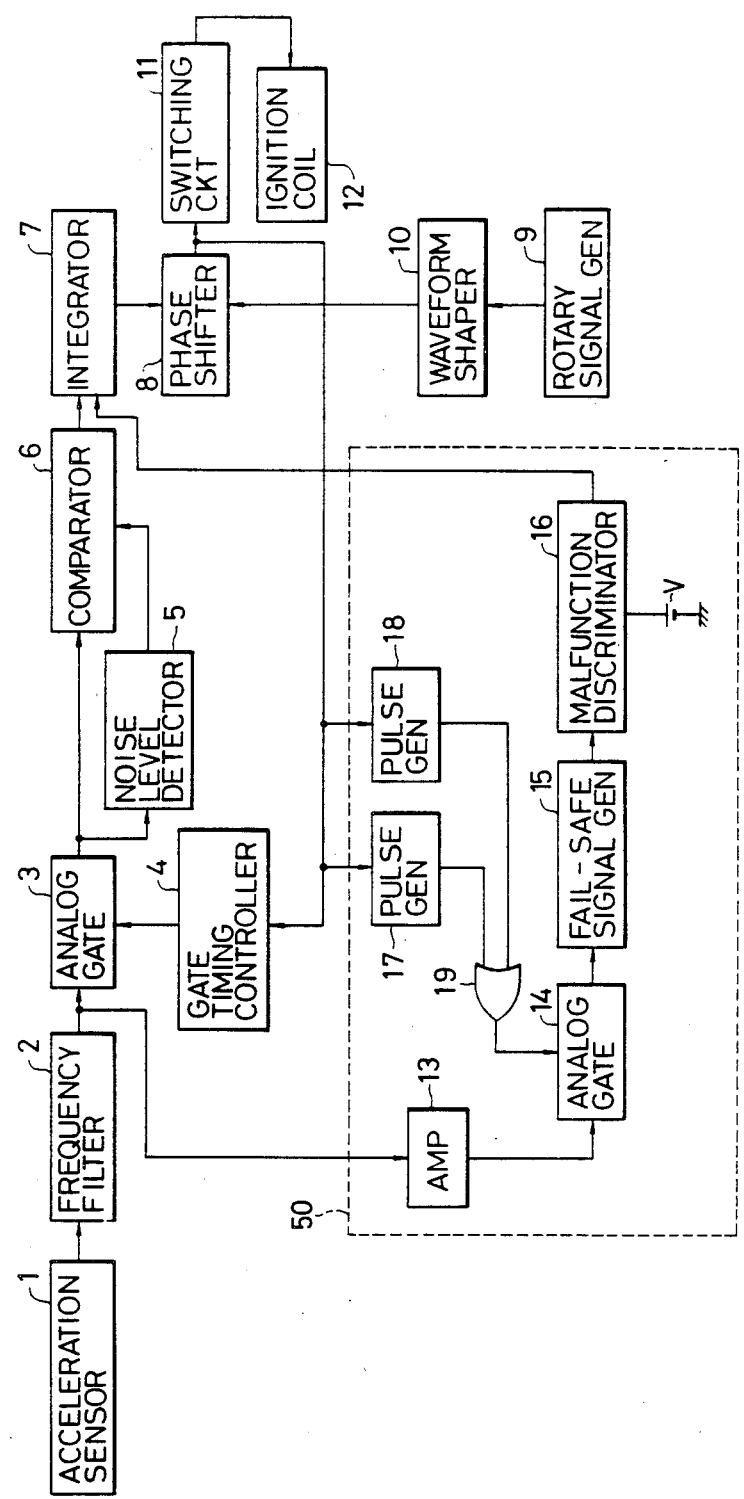
FIG. 1 is a block diagram showing an embodiment of the present invention.

The present invention will now be described in connection with one embodiment thereof with reference to the accompanying drawings. First of all, in FIG. 1: reference numeral 1 indicates an acceleration sensor which is attached to the engine for detecting the vibratory acceleration of the engine; numeral 2 indicates a frequency filter for passing that signal component of the output signal of the acceleration sensor 1 which has a frequency highly sensitive to the knocking; numeral 3 indicates an analog gate for blocking noise in the output signal of the frequency filter 2 which interferes with the knocking detection; numeral 4 indicates a gate timing controller for commanding the opening and closure of the analog gate 3 in response to the generation timing of the interfering induced ignition noises; numeral 5 indicates a noise level detector for detecting the level of mechanical vibration noises of the engine other than knocking; numeral 6 indicates a comparator for comparing the output voltage of the analog gate 3 and the output voltage of the noise level detector 5 for generating knocking detection pulses; numeral 7 indicates an integrator for integrating the output pulses of the comparator 6 to generate an integrated voltage according to the intensity of the knocking; numeral 8 indicates a phase shifter for shifting the position of a reference ignition signal in response to the output voltage of the integrator 7; numeral 9 indicates a rotary signal generator for generating an ignition signal in accordance with predetermined ignition angle advancing characteristics; numeral 10 indicates a waveform shaper for simultaneously shaping the waveform of the output of the rotary signal generator 9 and controlling the break of the power supply to an ignition coil 12; and numeral 11 indicates a switching circuit for interrupting the power supply to the ignition coil 12 in response to the output signal of the phase shifter 8.

Reference numeral 50 indicates a malfunction detecting circuit which is constructed as follows. Specifically: numeral 13 indicates an amplifier for amplifying the output of the frequency filter 2; numeral 14 indicates an analog gate for blocking the output signal of the amplifier 13 in response to the output of an OR circuit 19; numeral 15 indicates a fail-safe signal generator for generating a fail-safe detection signal from the signal blocked; numeral 16 indicates a malfunction discriminating circuit for discriminating the malfunction of the vibratory acceleration detecting system by comparing the levels of the output of that fail-safe signal generator 15 and a reference voltage V; and numerals 17 and 18 indicate pulse generators for generating pulses of predetermined durations at the starting and blocking of the power supply to the ignition coil 12, respectively, in synchronism with the rise and break of the output of the phase shifter 8.

The aforementioned OR circuit 19 generates its OR signal from the outputs of the pulse generators 17 and 18. Moreover, the aforementioned malfunction discriminating circuit 16 generates its voltage output at a predetermined level, when the acceleration sensor 1 malfunctions, to effect the phase shift of the phase shifter 8 by a predetermined retarded angle through the integrator 7.

Figure 2:
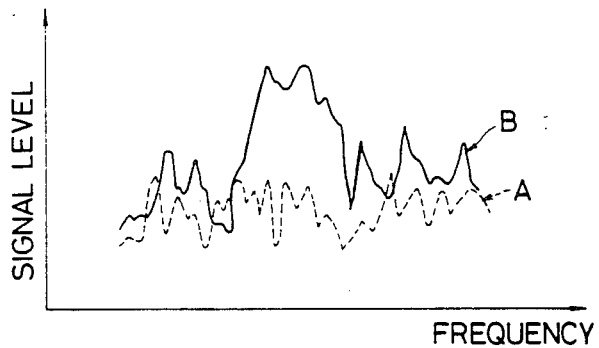
FIG. 2 is a graph illustrating the output characteristics of the acceleration sensor of FIG. 1.

The frequency characteristics of the output signal of the acceleration sensor 1 are shown in FIG. 2. Curve A corresponds to the case in which there is no knocking, whereas curve B corresponds to the case in which knocking takes place. The output of acceleration sensor 1 contains a knock signal (which is generated as a result of knocking), other mechanical noises of the engine, and a variety of noise components, such as ignition noises, which are to be carried in signal transmission passages. The comparison of the curves A and B of FIG. 2 will reveal that the knock signal has intrinsic frequency characteristics. This distribution is clearly different, depending for example upon the differences in the engine type and in the attached position of the acceleration sensor 1. By passing the frequency component belonging to the knock signal, therefore, the noises of other frequency components can be filtered out so that the knock signal can be efficiently detected.

The operating waveforms of the respective portions of FIG. 1 are shown in FIGS. 3 and 4, in which identical reference characters indicate waveforms of identical portions. FIG. 3 illustrates operation in which knocking of the engine does not take place, whereas FIG. 4 illustrates operation in which the knocking of the engine takes place.

The operation of the embodiment of FIG. 1 will now be described in detail.

The rotary signal, which is generated by the rotary signal generator 9 in accordance with ignition timing signal characteristics which have been predetermined in dependence, for example, upon the r.p.m. of the engine, has its waveform shaped by the action of the waveform shaper 10 into "on" and "off" pulses having a desired breaking angle. The signal thus shaped drives the switching circuit 11 through the phase shifter 8 thereby to interrupt the power supply to the ignition coil 12 so that the engine is ignited and run by the ignition voltage of the ignition coil 12, which is generated when the power supply current is blocked. The vibrations of the engine, which are caused during the running operation of the engine, are detected by the action of the acceleration sensor 1.

Figure 3A:
FIGS. 3, $a$–$h$, 4, $a$–$h$ and 5, $a$–$d$, $e_1$, $e_2$, $f_1$ and $f_2$ are diagrams illustrating the operating waveforms of the respective portions of FIG. 1.
Figure 3B:
Figure 3C:
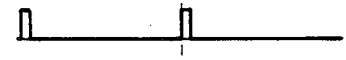
Figure 4C:
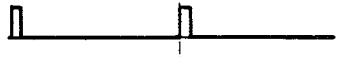

If there is no knocking of the engine, the vibrations of the engine due to knocking are not generated. Other mechanical vibrations will result in an output signal of the acceleration sensor 1 as illustrated in FIG. 3(a), containing mechanical noises and ignition noises which are to be carried on the signal transmission passage at an ignition timing F. That output signal can have its mechanical noise component considerably filtered out as illustrated in FIG. 3(b), after it has passed through the frequency filter 2. However, the ignition noise component is so intense that it may continue to be present at a high level even after it has passed through the frequency filter 2. Since such ignition noises may be misjudged as a knocking signal, the analog gate 3 is closed for a time period after the ignition timing by the output (which is illustrated in FIG. 3(c)) of the gate timing controller 4, which is to be triggered by the output of the phase shifter 9. This will block the ignition noises which occur during the periods of the pulses shown in FIG. 3(c). As a result, at the output of the analog gate 3, there are left only low level mechanical noises as indicated at ($\alpha$) in FIG. 3(d).

Figure 3D:
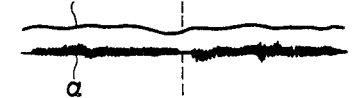
Figure 3E:
Figure 3F:

On the other hand, the noise level detector 5 responds to the change in the peak value of the output signal of the analog gate 3 to generate, in this case, a d.c. voltage which can respond to the relatively gentle change in the peak value of the usual mechanical noises and which is slightly higher than the peak value of the mechanical noises (as indicated at ($\beta$) in FIG. 3(d)). Since the output of the noise level detector 5 is higher than the average peak value of the output signal of the analog gate 3, no output is generated from the comparator 6, as illustrated in FIG. 3(e), so that all the noise signals are eliminated. As a result, the output voltage of the integrator 7 is left at a zero level, as illustrated in FIG. 3(f), and the phase angle (which corresponds to the phase difference of the input from shaper 10 shown in FIG. 3(a) and output of phase shifter 8 shown in FIG. 3(h)) remains at zero. As a result, the "on" and "off" phases of the switching circuit 11 which is driven by that output, i.e., the interruption phases of the power supply to the ignition coil 12, are in phase with the reference ignition signal of the output of the waveform shaper 10 so that the ignition timing is the same as the reference timing.

Figure 4A:

In case knocking takes place, on the other hand, the output of the acceleration sensor 1 contains the knocking signal which occurs during an interval a certain time after the ignition timing, as illustrated in FIG. 4(a). After passing through the frequency filter 2 and the analog gate 3, the signal will include knocking signals superimposed upon the mechanical noises, as indicated in FIG. 4(d). Of the signals having passed through the analog gate 3, the knocking signal has a steep rise which is faster than can be tracked by the noise detector 5, so that the level of the output voltage of the noise level detector 5 is delayed in responding to the knocking signal. As a result, the inputs to the comparator 6 are as indicated at ($\alpha$) and ($\beta$) in FIG. 4(d) so that pulses illustrated in FIG. 4(e) are generated at the output of the comparator 6. The integrator 7 integrates those pulses and generates an integrated voltage as illustrated in FIG. 4(f). Moreover, since the phase shifter 8 shifts the reference ignition signal of FIG. 4(g) to a retarded angle in accordance with the output voltage of the integrator 7, the phase shifter shown in FIG. 4(h) has its phase retarded with respect to the phase of the reference ignition signal of the waveform shaper 10 so that the switching circuit 11 is driven with the phase illustrated in FIG. 4(h). As a result, the ignition timing is retarded to obtain a state at which the knocking is prevented. It should be noted that the ignition timings F in FIGS. 3 and 4 are not fixed and that the timings F of FIG. 3 are not the same as those in FIG. 4. Rather, the timings F are defined by the trailing edges of the pulses in FIGS. 3(h) and 4(h).

Figure 4B:
Figure 4D:
Figure 4E:
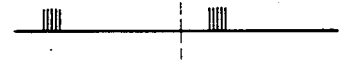
Figure 4F:
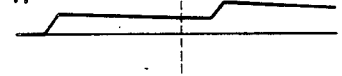
Figure 3G:
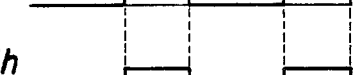
Figure 4G:
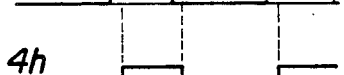
Figure 3H:
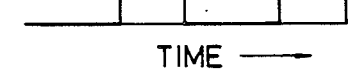
Figure 4H:
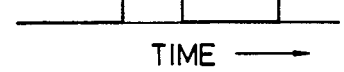

In the absence of a malfunction detection circuit according to the present invention, it will be apparent that the operation of FIGS. 4(a)–4(h) cannot be achieved if the knocking signal portion of FIG. 4(b) is not generated. Thus, if a knock occurs but is not detected, the circuit will always function as in FIGS. 3(a)–3(h) and the knocking will not be corrected.

Next, the operation of the malfunction detecting circuit 50 will be described with reference to the operating waveform diagram of FIGS. 5(a)–5(f$_2$). FIG. 5(a) illustrates the "on" and "off" outputs of the phase shifter 8 corresponding to FIGS. 3(h) and 4(h); FIG. 5(b) illustrates an electric current flowing through the ignition coil 12; FIGS. 5(c) and 5(d) illustrate the output pulses of the pulse generators 17 and 18, respectively; and FIGS. 5(e$_1$) and 5(e$_2$), and 5(f$_1$) and 5(f$_2$) illustrate the outputs of the amplifier 13 and the outputs of the analog gate 14, respectively, FIGS. 5(e$_1$) and 5(f$_1$) corresponding to the case in which the acceleration detecting system is normal and FIGS. 5(e$_2$) and 5(f$_2$) corresponding to the case in which the acceleration detecting system is abnormal.

First of all, in case the vibratory acceleration detecting system is normal, the amplifier 13 is fed with the output of the acceleration sensor 1 through the frequency filter 2. As a result, the output of the amplifier 13 is fed to the gate 14 in the form of the signal which contains both the vibrations and ignition noises detected in the acceleration sensor 1, as illustrated in FIG. 5(e$_1$). On the other hand, the pulse generators 17 and 18 generate, in synchronism with the rising and falling edges of the pulses output from the phase shifter 8, pulses having a predetermined time width as shown in FIGS. 5(c) and 5(d). These are composed in the OR circuit 19 to thereby control the aforementioned analog gate 14. As a result, the output of the analog gate 14 becomes a signal of the form shown in FIG. 5(f$_1$), which is prepared by blocking the output (e$_1$) of the amplifier in synchronism with the starting and blocking of the power supply to the ignition coil 12. The signal thus prepared is converted into a d.c. voltage, which has its peak value detected by the fail-safe signal generator 15 having an integrating function. The fail-safe signal generator 15 has the same operation as that of the aforementioned noise level detector 5 and functions to respond to the relatively gentle fluctuations in the peak value. The characteristics of the generator 15 output signal may be as illustrated in FIG. 6.

If the vibratory acceleration detecting system is normal, a vibration detection signal is generated as illustrated in FIG. 5(e$_1$), and there will be a vibration signal present in the output of the analog gate 14 during the passing interval of the gate as illustrated in FIG. 5(f$_1$). Thus, the output of the generator 15 may be as shown at C in FIG. 6. Incidentally, the vibratory acceleration of the engine becomes higher for higher r.p.m., but the signal generator 15 is selected such that its output characteristics are saturated substantially all over the r.p.m. range. This output is compared with the set voltage V by the discriminator 16 but is higher than that voltage V under normal conditions, so that no abnormal output is indicated by discriminator 16 and the ignition timing control circuitry functions as described above.

If a malfunction such as a break or a short-circuiting of the vibratory acceleration detecting system takes place, the vibratory acceleration cannot be detected. As a result, the input of the amplifier 13 is nothing but induction noises such as ignition noises, and the input of the analog gate 14 becomes such an intermittently generated signal as is illustrated in FIG. 5(e$_2$). Since the induction noises are practically restricted to the ignition noises, the output signal of the amplifier 13 is generated, as illustrated in FIG. 5(e$_2$), at the starting and blocking of the power supply to the ignition coil 12. Moreover, since the analog gate 14 blocks the signal at the starting and blocking of that power supply, the input of the fail-safe signal generator 15 in an abnormal state has no signal, as illustrated in FIG. 5(f$_2$), so that its output assumes a bias level as illustrated at D$_1$ in FIG. 6. The discriminator 16 then generates a malfunction detection signal to maintain the output of the integrator 7 at a predetermined level, since its output is lower than the predetermined voltage (V), and the angle of retardation by the phase shifter 8 is controlled to a predetermined value to retard the ignition timing by a predetermined angle.

Since the induction level of the ignition noises changes with the conditions of the wiring harness, the performance of the ignition system, the gap of the ignition plug or the like, the noise generating time period will change accordingly. It is, therefore, desired that the signals of the pulse generators 17 and 18 (as illustrated in FIGS. 5(c) and 5(d)) be pulses of long duration so as to completely block the noises. In order to prevent a reduction in the level of curve C of FIG. 6 even when the system is operating normally, and especially to prevent an excessive level reduction within a low r.p.m. range where the vibratory acceleration may be low, the pulse width is restricted. As a result, the amount of blocking of ignition noises in an abnormal state of operation may be low enough that the characteristics D$_1$ of FIG. 6 may sometimes rise or fall more or less in proportion to the r.p.m.

In order to increase the output level difference for the set voltage V in the aforementioned manner, it is preferred that in the normal state the gains of the amplifier 13 and the fail-safe signal generator 15 be higher and that the pulse widths of the pulse generators 17 and 18 be the smaller. In the abnormal state, on the other hand, it is preferred that those gains be lower and pulse widths be the wider. When striking a proper balance, it is necessary that those settings be determined taking the actual mounting states into consideration. It has been confirmed by our experiments that a practical and sufficient level difference (including variation in the detecting performance of the acceleration sensor 1) can be obtained, as illustrated at C and D$_1$ in FIG. 6. However, even if the level reduction of the characteristics C of FIG. 6 which occurs during knocking becomes so considerably high that the level itself becomes lower than the reference voltage V within a low r.p.m. range, no really serious problem arises. Specifically, an actual vehicle is hardly ever run with a low r.p.m. over a long period of time. At the start, for example, the r.p.m. of the engine is instantly raised to a value at which the level is saturated. As a result, the discriminator 16 compares the signal from the signal generator 15 with the predetermined voltage V so that it can accurately detect a malfunction in the vibratory acceleration detecting system. By this output, moreover, the integrated voltage can be generated from the integrator 7 to effect a predetermined angular retardation of the ignition timing.

As has been described hereinbefore, the system of the present invention is a system by which the output signal from the vibratory acceleration sensor is discriminated to detect the malfunction of the same, but it is not a system by which the malfunction is detected from the level of the voltage drop based upon the internal resistance of the vibratory acceleration sensor. As a result, the malfunction can be detected irrespective of the kind of vibratory acceleration sensor used. Typical known vibratory acceleration sensors include the magnetic strain sensor and the piezoelectric ceramic sensor. However, since the former detects the change in the magnetic flux due to the internal strain of a magnetic strain element by means of a coil, the malfunction can be detected if a d.c. current is fed to the internal resistance of that coil so that the voltage drop may be discriminated. According to the latter, on the contrary, since the piezoelectric ceramic element has the characteristics of a capacitor, it is difficult to detect the change in the voltage drop. According to the present invention, however, the malfunction can be detected accurately for either kind.

Incidentally, it is desired in the embodiment thus far described that the pulse width of the pulse generators 17 and 18 be set independently of each other in accordance with the generating state of the induction noises at the starting and blocking of the power supply to the ignition coil. Moreover, those pulse widths can also be controlled by an operating parameter such as the r.p.m. of the engine. Still moreover, if the comparison voltage V of the discriminator 16 is controlled in accordance with an operating parameter of the engine such as the r.p.m., the malfunction discrimination can be effected more reliably. In the foregoing embodiment, furthermore, the analog gate 14 is blocked at both the starting and blocking of the power supply to the ignition coil. However, even if the analog gate 14 is so constructed as to be blocked only in synchronism with either the blocking or the starting, operation will not be adversely effected, since the induction noises in the abnormal state of the acceleration sensor can still be substantially removed although not completely. Thus, it is possible to discriminate the normal function and malfunction of the acceleration sensor.

As has been described hereinbefore, according to the present invention, in the system for detecting the vibrations of the engine by means of an acceleration sensor to thereby control the ignition timing in response to the knocking signal obtained from the detected output, the malfunction of the acceleration sensor is discriminated on the basis of the output of a gate which is made operative to block the passage of the output of the aforementioned acceleration sensor for a predetermined time period in synchronism with the switching operation of the power supply circuit of the ignition coil. A sensor malfunction can be accurately detected while attenuating or removing the noises which are induced in the output circuit portion of the acceleration sensor. As a result, it is made possible by this malfunction detection signal to retard the excessive advance in the ignition timing or to generate a warning signal. Moreover, such malfunction can be detected irrespective of the kinds of the acceleration sensor used. The invention can also easily detect a malfunction even if the acceleration sensor is a piezoelectric ceramic element in which it is difficult to detect malfunction by the voltage drop method.

What is claimed is:

1. An ignition timing control system for an internal combustion engine of the type comprising switching means for interrupting the power supply to an ignition coil in response to an ignition signal, ignition signal generating means for generating said ignition signal in synchronism with the revolution of said engine, an acceleration sensor for detecting the vibratory acceleration of said engine, and control means for controlling the timing of said switching means by said ignition signal in accordance with engine knocking as determined by said acceleration sensor, wherein the improvement comprises:

malfunction detection means for generating a malfunction detection signal in response to detection of a malfunction in said ignition timing control system, said malfunction detection means including gate means for receiving said sensor output and for cyclically blocking the passage of said sensor output within the malfunction detection means for at least one predetermined time interval in synchronism with operation of said switching means responsive to said ignition signals; and means in said control means responsive to said malfunction detection signal for controlling the timing of said switching means independently of the presence or absence of engine knocking, wherein said switching means supplies power to said ignition coil during intervals each beginning with a starting time and terminating with a blocking time, and said gate means blocks said sensor output in response to gate control signals, said malfunction detection means further comprising gate control means for generating said gate control signals only at one or both of said starting times or blocking times.

2. An ignition timing control system as claimed in claim 1, wherein said control means in response to said malfunction detection signal adjusts the timing of said switching device to a predetermined timing angle.

3. An ignition timing control system as claimed in claim 2, wherein said predetermined angle is variable in accordance with engine operating conditions.

4. An ignition timing control system as claimed in claim 3, wherein said control means comprises timing signal generating means for generating said ignition signal with a timing in accordance with engine operating conditions, and phase shift means for shifting the phase of said ignition signal in accordance with detected engine knock, said phase shift means providing a predetermined phase shift in response to said malfunction detection signal.

5. An ignition timing control system as claimed in claim 1, wherein said gate control means generates said gate control signals at both said starting and blocking times.

6. An ignition timing control system as claimed in claims 1 or 5, wherein said gate control signals are of a duration variable in accordance with an engine operating parameter.

7. An ignition timing control system as claimed in claim 1, wherein said malfunction detection means further includes:

discriminating means for detecting sensor malfunction in accordance with the output of said gate means.

8. An ignition timing control system as claimed in claim 1 or 7, wherein said discriminating means comprises means for generating a substantially d.c. signal corresponding to the amount of detected vibration represented in said gate output signal, and means for generating said malfunction detection signal when said d.c. signal is below a threshold value.

9. An ignition timing control system as claimed in claim 8, wherein said threshold value is variable in accordance with an engine operating parameter.

* * * * *